United States Patent
Arai

(10) Patent No.: US 7,053,971 B2
(45) Date of Patent: May 30, 2006

(54) LIQUID CRYSTAL DISPLAY PANEL

(75) Inventor: Makoto Arai, Tokorozawa (JP)

(73) Assignee: Citzen Watch Co., Ltd., Tokyo (JP)

( * ) Notice: Subject to any disclaimer, the term of this patent is extended or adjusted under 35 U.S.C. 154(b) by 165 days.

(21) Appl. No.: 10/617,871

(22) Filed: Jul. 14, 2003

(65) Prior Publication Data

US 2004/0135957 A1   Jul. 15, 2004

(30) Foreign Application Priority Data

Jul. 17, 2002   (JP) .............................. 2002-207845

(51) Int. Cl.
    *G02F 1/1343* (2006.01)
(52) U.S. Cl. ................... 349/151; 349/147; 349/157
(58) Field of Classification Search ............. 349/157, 349/147, 148, 155, 151, 149
    See application file for complete search history.

(56) References Cited

U.S. PATENT DOCUMENTS

| | | | | |
|---|---|---|---|---|
| 5,640,216 | A * | 6/1997 | Hasegawa et al. | 349/58 |
| 5,671,030 | A * | 9/1997 | Ohnuma et al. | 349/106 |
| 6,850,308 | B1 * | 2/2005 | Fujioka et al. | 349/153 |
| 6,894,758 | B1 * | 5/2005 | Hagiwara et al. | 349/152 |
| 6,922,225 | B1 * | 7/2005 | Hinata | 349/148 |
| 6,927,818 | B1 * | 8/2005 | Hinata et al. | 349/114 |
| 2002/0018325 | A1 * | 2/2002 | Nakatani et al. | 360/324.2 |
| 2002/0154263 | A1 | 10/2002 | Kamiya | |
| 2002/0163614 | A1 * | 11/2002 | Hinata et al. | 349/139 |

FOREIGN PATENT DOCUMENTS

| JP | 63264729 | A | * | 11/1988 |
|---|---|---|---|---|
| JP | 04030123 | A | * | 2/1992 |
| JP | 05241165 | A | * | 9/1993 |
| JP | 09073093 | A | * | 3/1997 |
| JP | 10301096 | A | * | 11/1998 |
| JP | 11242229 | A | * | 9/1999 |
| JP | 2001117103 | A | * | 4/2001 |
| JP | 2002148639 | A | * | 5/2002 |
| JP | 2002-189227 | | | 7/2002 |
| JP | 2002-350892 | | | 12/2002 |

* cited by examiner

*Primary Examiner*—Kenneth Parker
(74) *Attorney, Agent, or Firm*—Smith, Gambrell & Russell, LLP

(57) ABSTRACT

In a liquid crystal display panel, connecting wires, having a two-layer structure formed of an indium-tin oxide (ITO) layer and a low-reflection metal layer each, are formed in a image non-display section on an upper substrate, while a shielding layer is formed in the image non-display section on a lower substrate. The gap between the upper and lower substrates is made uniform in both an image display section and the image non-display section by adjusting the thickness of the shielding layer relatively to that of the color filter layer formed in the image display section on the lower substrate or by adjusting the diameter of spacers arranged in the image non-display section relatively to that of spacers arranged in the image display section.

17 Claims, 8 Drawing Sheets

LIQUID CRYSTAL DISPLAY PANEL

BACKGROUND OF THE INVENTION

1. Field of the Invention

The present invention relates to a small-sized liquid crystal display panel, and more particularly, to a small-sized liquid crystal display panel free from gap irregularity in an image display section.

2. Description of the Related Art

A patent application was filed in Japan for the construction of a liquid crystal display panel on Feb. 8, 2002 and published on Dec. 4, 2002 (JP. 2002-350892A). Further, its corresponding U.S. patent application was filed on May 9, 2002 and published as 2002/0154263 A1 on Oct. 24, 2002. This related art will now be described with reference to FIGS. 7 to 12.

As shown in FIGS. 7 and 8, an upper transparent substrate 2 and a lower transparent substrate 4 are formed of a glass substrate each, and are bonded to each other by means of a seal portion 16. A region that is surrounded by the substrates 2 and 4 and the seal portion 16 is filled with a liquid crystal material. Electrode wire groups (not shown in FIGS. 7 and 8) are formed individually on the lower surface of the upper transparent substrate 2 and the upper surface of the lower transparent substrate 4. Further, an electrode drive IC 12 that outputs signals for driving the electrode wire groups is provided directly on the upper transparent substrate 2 by chip-on-glass mounting. Necessary signals for the electrode drive IC 12 are externally transmitted through a flexible printed circuit 50 that is bonded to the upper transparent substrate 2 with an anisotropic conductive film.

FIG. 9 shows the electrode wire groups that are arranged on the upper and lower transparent substrates 2 and 4. In FIG. 9, full lines represent electrode wire groups 66, 54 and 56 on the upper transparent substrate 2, and two-dot chain lines represent electrode wire groups 62 and 64 on the lower transparent substrate 4. The electrode wire group 66, among the electrode wire groups 66, 54 and 56 on the upper transparent substrate 2, includes signal electrode wires, while the electrode wire groups 54 and 56 include connecting wires. On the other hand, both the electrode wire groups 62 and 64 on the lower transparent substrate 4 include scanning electrode wires. Numeral 52 denotes the contour of the upper substrate 2.

As shown in FIG. 9, the signal electrode wires 66 are connected directly to the electrode drive IC 12 on the upper transparent substrate 2. The scanning electrode wires 62 that cover the upper half of a display screen are connected to the electrode drive IC 12 through the connecting wires 54 on the right-hand side of the screen. The scanning electrode wires 64 that cover the lower half of the display screen are connected to the electrode drive IC 12 through the connecting wires 56 on the left-hand side of the screen. The connecting wires 54 on the right-hand side of the display screen and the scanning electrode wires 62 on the upper half of the screen are connected by means of a terminal area 58 in the seal portion 16. The connecting wires 56 on the left-hand side of the display screen and the scanning electrode wires 64 on the lower half of the screen are connected by means of a terminal area 60 in the seal portion 16. An anisotropic conductive sealant (hereinafter referred to as ACS) that is doped with conductive particles is used for the seal portion 16.

As shown in FIG. 9, the electrode drive IC 12 is mounted on one side (upper side) of the rectangular upper substrate 2, while the connecting wires 54 and 56 are located individually on two opposite sides (right- and left-hand sides) that extend at right angles to the one side on which the IC 12 is mounted.

A region in which the signal electrode wires 66 on the upper transparent substrate 2 and the scanning electrode wires 62 and 64 on the lower transparent substrate 4 cross one another forms an image display section 18. A point of intersection of each signal electrode wire 66 and each of the scanning electrode wires 62 and 64 constitutes one pixel.

Normal liquid crystal display cannot be enjoyed in a region that ranges from the seal portion 16 of the liquid crystal display panel to the vicinity of the inside of the seal portion 16. Accordingly, a certain gap, i.e., a image non-display section 20, should be provided between the image display section 18 and the seal portion 16 lest the seal portion 16 be seen if the display panel is viewed diagonally. In order to downsize the liquid crystal display panel, therefore, the connecting wires 54 and 56 are laid in the image non-display section 20.

In order to lay the numerous connecting wires 54 and 56 in the narrow image non-display section 20, each of the connecting wires 54 and 56 must be narrowed considerably. Normally, each pixel is a square each side of which is about 200 to 300 μm long, so that each of the scanning electrode wires 62 and 66 has a width of 200 to 300 μm. In order to lay the connecting wires 54 and 56 in the image non-display section 20, however, the width of each of them must be restricted to about one tenth of that of each of the scanning electrode wires 62 and 66, that is, to 20 to 30 μm. If the width of each connecting wire is reduced in this manner, its resistance increases inevitably. As the liquid crystal is driven, therefore, a problem of picture deterioration is aroused such that signals applied to liquid crystal pixels become dull to increase cross talk.

To solve this problem of picture deterioration, the film thickness of each electrode may be increased or a low-reflection metal layer, such as a chromium layer, may be applied to each connecting wire. Normally, a transparent indium-tin oxide (hereinafter referred to as ITO) layer is used for an electrode wire and may be thickened. Alternatively, the connecting wire may be formed having a laminate structure of ITO and low-reflection chromium in a manner such that an ITO layer of about 0.2-μm thickness is applied to a low-reflection chromium layer of about 0.3-μm thickness that is previously formed on the surface of a transparent substrate. Since the sheet resistance of the low-reflection chromium layer of 0.3-μm thickness is about one tenth of that of the ITO layer of 0.2-μm thickness, the chromium layer has a great function to lower the resistance of the connecting wire.

If the connecting wires 54 and 56 that are formed of a two-layer structure of ITO and low-reflection chromium are used, the low-reflection chromium forms a shielding layer. If the liquid crystal pixels at the points of intersection of the connecting wires 54 and 56 and the scanning electrode wires 62 and 64 are lit unexpectedly, therefore, they cannot be seen from above. This is another effect for improvement.

FIG. 10 is an enlarged view for illustrating a configuration near the terminal area 58 that connects the connecting wire 54 on the right-hand side of the display screen shown in FIG. 9 and the scanning electrode wire 62 on the upper half of the screen. As shown in FIG. 10, an end portion of the connecting wire 54 is extended to the seal portion 16 and forms the terminal area 58. In the terminal area 58, the connecting wire 54 is connected electrically to the scanning electrode wire 62 by means of the ACS. In FIG. 10, a hatched portion of the connecting wire 54 is a region in which a low-reflection chromium layer is attached to an ITO layer. As mentioned before, the resistance of the connecting wire 54 can be lowered by attaching the low-reflection chromium layer to the ITO layer. The region of the connecting wire 54 in which the low-reflection chromium layer is attached to the ITO layer may be restricted to the portion in the image non-display section 20 or may be designed to include the terminal area 58 as well as the portion in the image non-display section 20.

FIG. 11 shows the region of the connecting wire in which the low-reflection chromium layer is attached to the ITO layer. As indicated by hatching in FIG. 11, the low-reflection chromium layer is attached to each of regions 70 and 72 that cover the connecting wires 54 and 56.

According to the related art described above, the resistance of the connecting wire is lowered to prevent picture deterioration by adding the low-reflection chromium layer to the ITO layer of the connecting wire. However, a new problem is aroused. This problem will be described with reference to 12.

FIG. 12 is a sectional view taken along line A–A' of FIG. 11. On the lower transparent substrate 4, as shown in FIG. 12, color filter layer 24 of red (R), green (G), and blue (B) are formed repeatedly in the image display section 18. Further, a shielding layer 74 of black resin is formed in the image non-display section 20. It is as thick as the color filter layer 24. The scanning electrode wires 62 are formed on the color filter layer 24 and the shielding layer 74. If an auxiliary light source (not shown) is provided on the lower surface of the lower transparent substrate 4, the shielding layer 74 serves to prevent leakage of light from the image non-display section 20.

On the upper transparent substrate 2, on the other hand, the signal electrode wires 66 are formed in the image display section 18, and the connecting wires 54 are formed in the image non-display section 20. Each connecting wire 54 is a laminate structure of an ITO layer and a low-reflection chromium layer 22. The low-reflection chromium layer 22 is situated on the side of the upper transparent substrate 2. The ITO layer of the connecting wire 54 extends to the seal portion 16 and forms the terminal area 58.

A region that is surrounded by the upper transparent substrate 2, lower transparent substrate 4, and seal portion 16 forms a liquid crystal layer 10. In order to provide an accurate gap tl2 for the liquid crystal layer 10, spacers 32 and 34 of the same diameter for the image display section 18 and the image non-display section 20 are arranged in the layer 10.

The problem lies in the thickness of each connecting wire 54 in which the low-reflection chromium layer 22 is attached to the ITO layer. Normally, the respective ITO layers of each scanning electrode wire 62, signal electrode wire 66, and connecting wire 54 are about 0.2 µm thick. Further, the thickness of the low-reflection chromium layer attached to the ITO layer of the connecting wire 54 is set to about 0.3 µm. Thereupon, the thickness of the connecting wire formed in the image non-display section 20 on the upper transparent substrate 2 is greater than that of the signal electrode wire 66 formed in the image display section 18 on the substrate 2 by a margin corresponding to the thickness of the low-reflection chromium layer 22, i.e., by about 0.3 µm.

If the spacers 32 and 34 in the liquid crystal layer 10 for the image display section 18 and the image non-display section 20 have the same diameter, a gap tl3 between the upper and lower transparent substrates 2 and 4 in the image non-display section 20 is greater than a gap tl4 between the substrates 2 and 4 in the image display section 18 by a margin corresponding to the thickness (0.3 µm) of the low-reflection chromium layer 22, as shown in FIG. 12.

Since the upper transparent substrate 2 is formed of a hard glass substrate, a part of the image display section 18 of the substrate 2, which adjoins the image non-display section 20, gradually widens the distance from the lower transparent substrate 4 as the image non-display section 20 is approached. In consequence, the spacers 32 fail to function on that part of the upper transparent substrate 2, so that the liquid crystal layer 10 is subject to gap irregularity. In an STN liquid crystal, gap irregularity that exceeds 0.1 µm is visually recognized as failure in display. Therefore, gap irregularity of 0.3 µm inevitably causes non-negligible deterioration of display.

Described in a Japanese patent document, JP 2002-189227 A (especially in FIGS. 17 to 19), is a solution to the problem of the liquid crystal display panel described above. According to this method, connecting wires (wiring patterns) are formed of highly conductive metal, such as aluminum, so that the resistance can be prevented from increasing as the connecting wires are laid in the image non-display section and narrowed. In this case, each connecting wire of aluminum is made as thick as the ITO layer of each signal electrode wire, so that the gap between the upper and lower substrates is uniform in an area ranging from the image display section to the image non-display section. Thus, unevenness in display is prevented. However, restriction of the thickness of each connecting wire of aluminum to that of the ITO layer of each signal electrode wire will prevent lowering the resistance by increasing the thickness of the connecting wire.

If the resistance of each connecting wire is lowered by attaching the low-reflection chromium layer of chromium or the like to the connecting wire, in order to prevent picture deterioration by cross talk, as described above, the gap irregularity of the liquid crystal layer inevitably causes deterioration in display. This gap irregularity may possibly be eliminated by forming the connecting wire from a thin, highly conductive metal sheet. If this is done, however, the thinness of the wire inevitably cancels the function of the metallic material to lower the resistance.

SUMMARY OF THE INVENTION

The object of the present invention is to provide a liquid crystal display panel, which uses a low-resistance connecting wire construction and is free from unevenness in display attributable to gap irregularity of a liquid crystal layer.

A liquid crystal display panel according to the present invention is a liquid crystal display panel in which a liquid crystal layer is held between a first substrate and a second substrate having electrodes each, and drive electrode groups for individually driving the electrodes of the first substrate and the electrodes of the second substrate are arranged on one side of, or one and the opposite sides of, the first substrate. Further, the liquid crystal display panel comprises a seal portion bonding the first and second substrates together and connecting wires set on a side perpendicular to the side on which drive electrode groups are arranged and connecting the electrodes and the drive electrode groups. An image display section is located inside the seal portion, and a image non-display section is located between the image display section and the seal portion. The connecting wires are arranged in the image non-display section and have a thickness greater than that of the electrodes in the image display section. The distance between the first and second substrates in the image display section is substantially equal to the distance between the first and second substrates in the image non-display section.

The liquid crystal display panel according to the invention may assume the following aspects.

Each of the connecting wires includes a low-reflection metal layer.

The electrodes are formed of indium-tin oxide, and each of the connecting wires is a two-layer structure formed of an indium-tin oxide layer and a low-reflection metal layer.

The electrodes are formed of indium-tin oxide, and each of the connecting wires is a two-layer structure formed of indium-tin oxide.

A color filter layer is arranged in the image display section and spacers are arranged between the first and second substrates, the diameter of the spacers arranged in the image display section being smaller than that of the spacers arranged in the image non-display section.

A color filter layer is arranged in the image display section, and the thickness of each of the connecting wires is substantially equal to the sum of the thickness of the color filter layer and the thickness of each of the electrodes.

A shielding layer is arranged in the image non-display section.

A color filter layer thicker than the shielding layer is arranged in the image display section.

A color filter layer is arranged in the image display section and a shielding layer is arranged in the image non-display section. The electrodes are formed of indium-tin oxide, each of the connecting wires is a two-layer structure formed of an indium-tin oxide layer and a low-reflection metal layer, the thickness of the indium-tin oxide layer constituting the connecting wire being substantially as thick as the indium-tin oxide constituting the electrode, and the thickness of the shielding layer is smaller than the thickness of the color filter layer by a margin corresponding to the thickness of the low-reflection metal layer.

A color filter layer substantially as thick as the shielding layer is arranged in the image display section and spacers are arranged between the first and second substrates, the diameter of the spacers arranged in the image display section being greater than that of the spacers arranged in the image non-display section.

A reflective layer and a color filter layer are arranged in the image display section overlapping one another, each of the color filter layer being substantially as thick as the shielding layer, and the thickness of each of the connecting wires is substantially equal to the sum of the thickness of the reflective layer and the thickness of each of the electrodes.

A color filter layer and a reflective layer are arranged in the image display section overlapping one another and a shielding layer is arranged in the image non-display section. The electrodes are formed of indium-tin oxide, each of the connecting wires is a two-layer structure formed of an indium-tin oxide layer and a low-reflection metal layer, the thickness of the indium-tin oxide layer constituting the connecting wire being substantially as thick as the indium-tin oxide constituting the electrode, the color filter layer is substantially as thick as the shielding layer, and the low-reflection metal layer is substantially as thick as said reflective layer.

The shielding layer is formed of black resin.

The drive electrode groups are mounted directly with an electrode drive IC.

The low-reflection metal layer is a two-layer structure formed of a chromic oxide layer and a chromium layer.

According to the present invention arranged in this manner, there may be provided a liquid crystal display panel such that the resistance of wiring patterns can be lowered and image deterioration that is attributable to an irregular gap between the substrates can be prevented. Further, the shielding layer can intercept light having leaked from the wiring patterns and unnecessary display in regions where the wiring patterns three-dimensionally cross one another. With use of the shielding layer, moreover, the gap between the substrates can be kept uniform by adjusting its thickness only, so that production management becomes easy.

BRIEF DESCRIPTION OF THE DRAWINGS

The above and other objects and features of the invention will be more apparent from the following description of the embodiments with the reference to the accompanying drawings, in which.

DETAILED DESCRIPTION OF THE PREFERRED EMBODIMENTS

Figure 9:
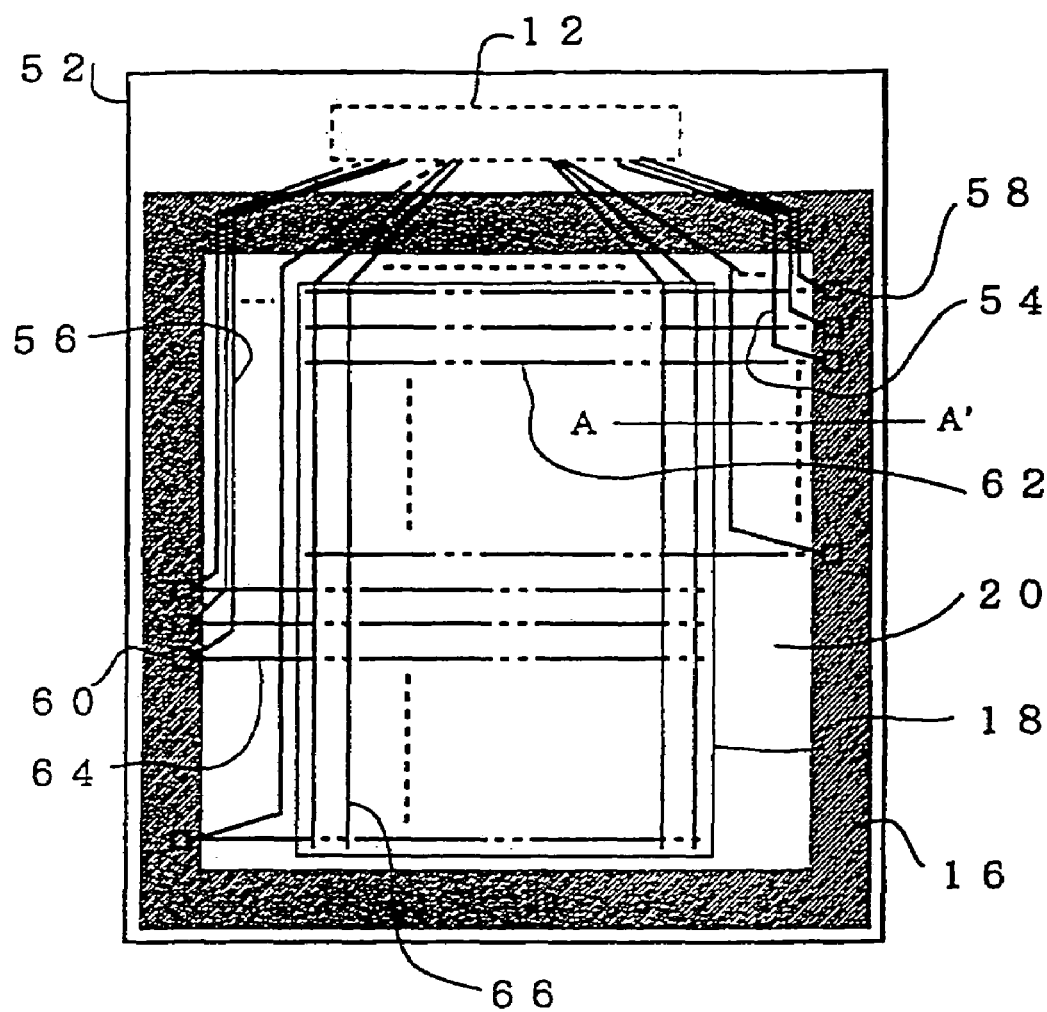
FIG. 9 is a view illustrating electrode wire groups arranged on upper and lower transparent substrates.
Figure 10:
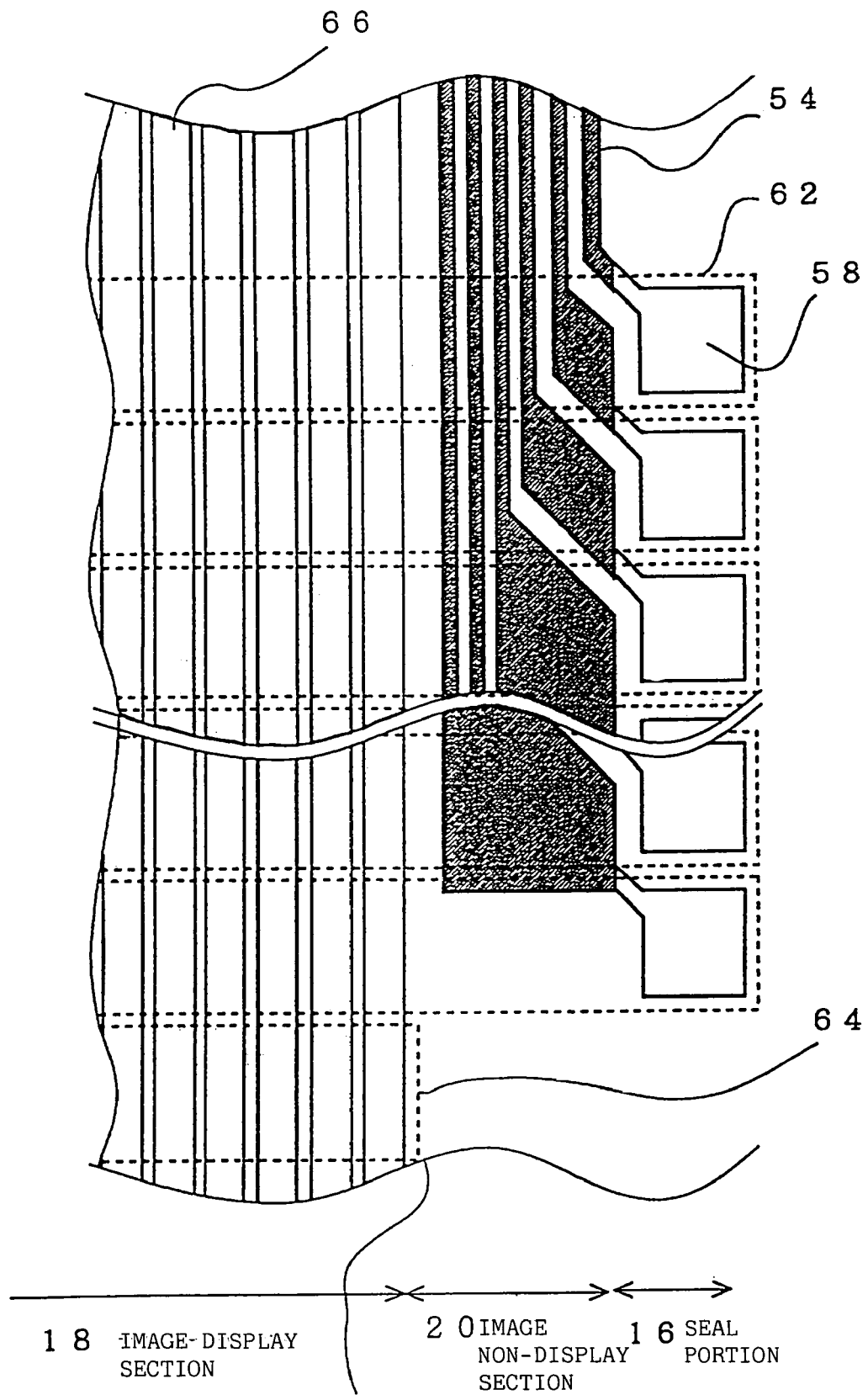
FIG. 10 is a partial enlarged view of the liquid crystal display panel of FIG. 9.

Liquid crystal display panels according to several embodiments of the present invention will now be described with reference to FIGS. 1 to 6. FIGS. 1 to 6 are sectional views taken along line A–A' of FIG. 9.

A liquid crystal display panel according to a first embodiment will be described with reference to FIG. 1.

On a lower transparent substrate 4, color filter layer 24 of red (R), green (G), and blue (B) having a thickness of about 0.8 μm are formed repeatedly in an image display section 18. Eighty scanning electrode wires 62 and eighty scanning electrode wires 64 are formed on the color filter layer 24. FIG. 1 is a sectional view taken along line A–A' of FIG. 9. Therefore, only the scanning electrode wires 62 that cover the upper half of the display screen are shown in FIG. 1, while the scanning electrode wires 64 that cover the lower half of the display screen are not. Each of the electrode wires 62 and 64 is formed of an ITO layer with a thickness of about 0.2 μm.

On an upper transparent substrate 2, on the other hand, 360 signal electrode wires 66, 120 for each of the colors R, G and B, are formed in the image display section 18. Each of the electrode wires 66 is formed of an ITO layer with a thickness of about 0.2 μm. On the upper transparent substrate 2, connecting wires 54 are formed in a image non-display section 20. Each connecting wire 54 is a laminate structure that is formed of an ITO layer with a thickness of about 0.2 μm and a low-reflection metal layer (low-reflection chromium layer 22 formed by laminating a chromic oxide layer and a chromium layer) with a thickness of about 0.3 μm. Thus, each connecting wire 54 has a structure in which the chromic oxide layer, chromium layer, and ITO layer are laminated in succession to one another from the side of the upper transparent substrate 2. The low-reflection chromium layer 22 is situated on the side of the upper transparent substrate 2. Thus, the thickness of each connecting wire 54 is greater than that of each scanning electrode wire 62 or signal electrode wire 66 by a margin corresponding to the thickness of the low-reflection chromium layer 22.

The connecting wires 54 that are set in the image non-display section 20 (on the right-hand side of the screen) on the upper transparent substrate 2 are 80 in number or as many as the scanning electrode wires 62 (that cover the upper half of the screen). For simplicity, however, only some of them are shown in FIG. 1. The ITO layer of the connecting wire 54 at the right-hand end extends to a seal portion 16 and forms a terminal area 58.

The upper transparent substrate 2 and the lower transparent substrate 4 are bonded to each other by means of the seal portion 16. A region that is surrounded by the substrates 2 and 4 and the seal portion 16 forms a liquid crystal layer 10. In order to provide an accurate gap for the liquid crystal layer 10, image display section spacers 26 for the image display section 18 and image non-display section spacers 28 for the image non-display section 20 are arranged in the layer 10.

A reflective layer or translucent reflective layer (not shown in FIG. 1) is spread over the whole area of the lower transparent substrate 4.

In the image display section 18, the color filter layer 24 of 0.8-μm thickness, scanning electrode wires 62 of 0.2-μm thickness, and signal electrode wires 66 of 0.2-μm thickness are arranged between the upper and lower transparent substrates 2 and 4. The total thickness of these layers is 1.2 μm. In the image non-display section 20, on the other hand, the scanning electrode wires 62 of 0.2-μm thickness and connecting wires 54 of 0.5-μm thickness (low-reflection chromium layer of 0.3 μm plus ITO layer of 0.2 μm) are arranged between the upper and lower transparent substrates 2 and 4. The total thickness of these layers is 0.7 μm.

With use of the image display section spacers 26 having a certain diameter and the image non-display section spacers 28 that are 0.5 μm (=1.2 μm−0.7 μm) greater in diameter than the spacers 26, according to the present embodiment, therefore, a gap t1 between the upper and lower transparent substrates 2 and 4 in the image display section 18 is made equal to a gap t2 between the substrates 2 and 4 in the image non-display section 20. Accordingly, the resulting liquid crystal display panel is free from unevenness in display.

Arrangement of the spacers 26 and 28 having the different diameters in the image display section 18 and the image non-display section 20 in the liquid crystal layer 10 are realized by conventional methods, such as masking the display section 18 or 20 to distribute the spacers, forming the spacers having the different diameters separately in the display sections 18 and 20 by printing, or forming the spacers separately in the display sections 18 and 20 by photolithography.

Figure 1:
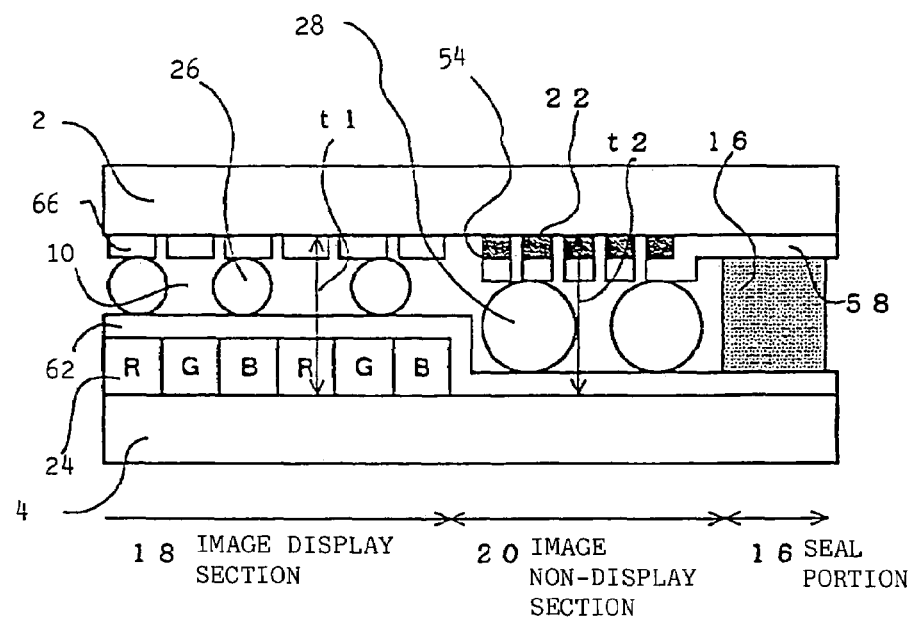
FIG. 1 is a sectional view of a liquid crystal display panel according to a first embodiment of the invention.

In FIG. 1, the scanning electrode wires 62 and the signal electrode wires 66 are arranged on the lower and upper substrates 4 and 2, respectively. In contrast with this, however, the signal electrode wires 66 and the scanning electrode wires 62 may be arranged on the lower and upper substrates 4 and 2, respectively.

Drive electrode groups for individually driving the signal electrode wires 66 and the scanning electrode wires 62 and 64 are arranged on one side of the upper transparent substrate 2 as a first substrate or the opposite side. These electrode groups are not shown in FIG. 1 that illustrates the first embodiment. A description of those parts is omitted for simplicity, since they are arranged in the same manner as those of the prior art examples. The same applies to the following embodiments.

Figure 11:
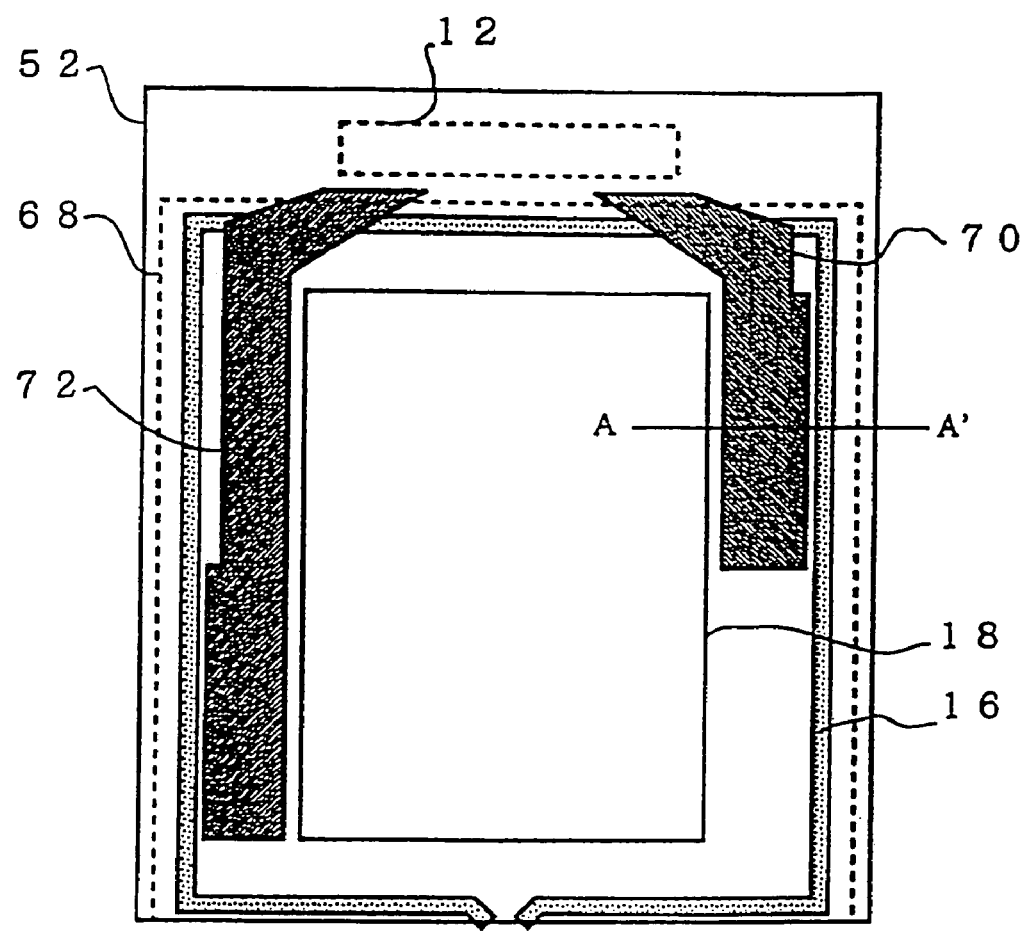
FIG. 11 is a view illustrating a region in which a low-reflection chromium layer is attached to a connecting wire.
Figure 12:
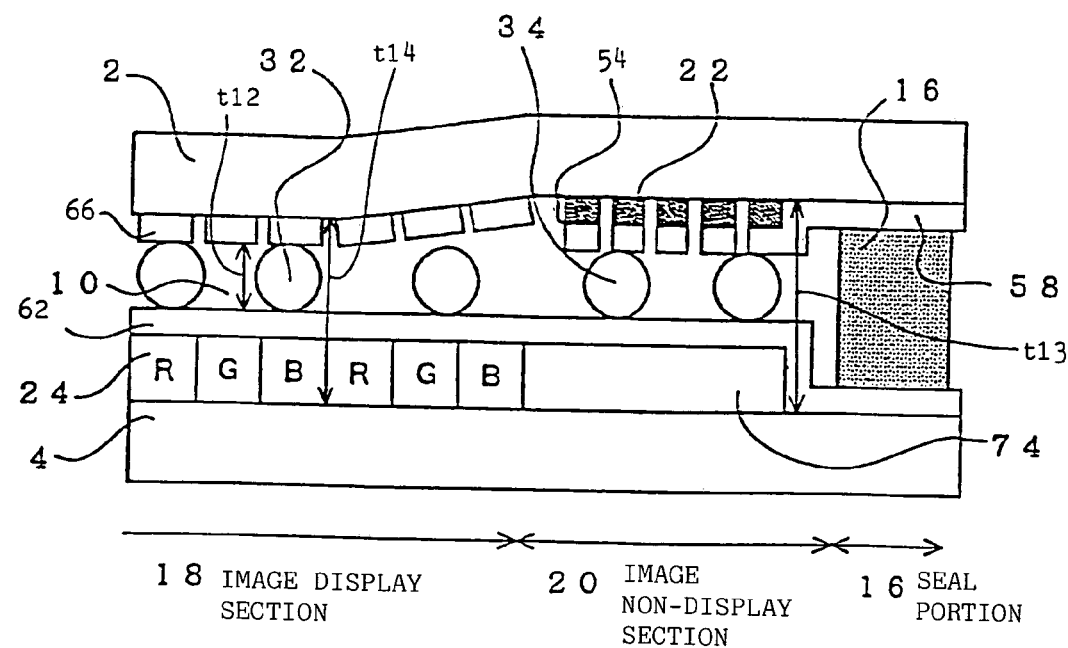
FIG. 12 is a sectional view taken along line A–A' of FIG. 11.

According to the present invention, the drive electrode groups may be connected directly with terminals of an electrode drive IC (so-called chip-on-glass mounting, configuration of FIG. 11) or connected with wiring patterns of a circuit board that mounted with an electrode drive IC.

Figure 2:
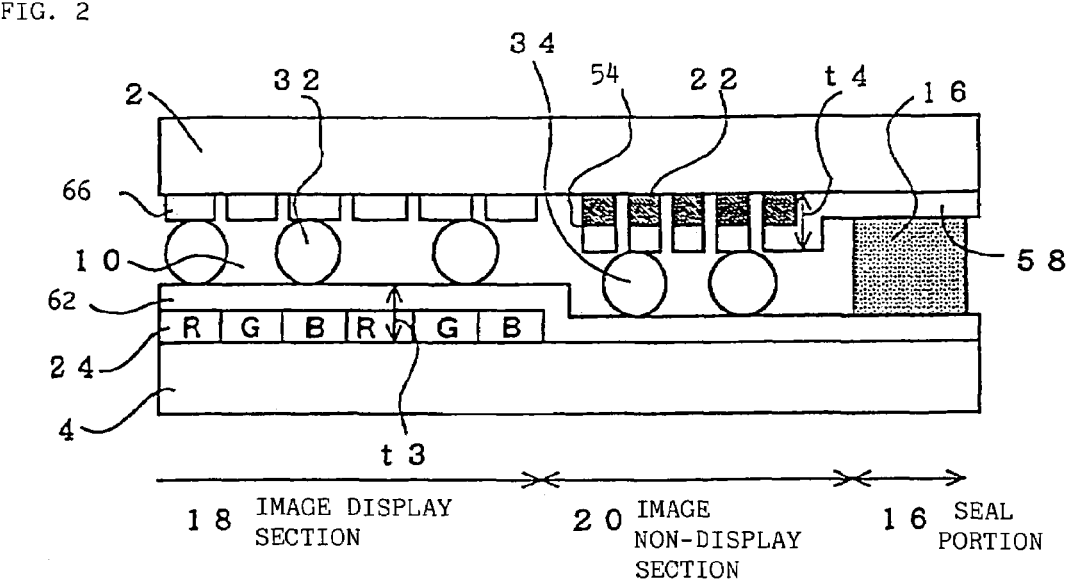
FIG. 2 is a sectional view of a liquid crystal display panel according to a second embodiment of the invention.

A liquid crystal display panel according to a second embodiment will be described with reference to FIG. 2. In FIG. 2, the same reference numerals are used for component parts identical with those shown in FIG. 1.

A liquid crystal display panel of FIG. 2 is a modification of the liquid crystal display panel of FIG. 1 in which the thickness of the color filter layer 24 is reduced by 0.4 μm while the thickness of the low-reflection chromium layer 22 of each connecting wire 54 is increased by 0.1 μm. According to this modification, a thickness t3 (0.6 μm) that is obtained by adding the thickness of the color filter layer 24 and that of the scanning electrode wire 62 in the image display section 18 is substantially equal to a thickness t4 (0.4 μm+0.2 μm=0.6 μm) of each connecting wire 54 in the image non-display section 20.

Accordingly, the total thickness of the members (color filter layer 24, scanning electrode wires 62, and signal electrode wires 66) that are arranged between the upper transparent substrate 2 and the lower transparent substrate 4 in the image display section 18 is equal to the total thickness of the members (scanning electrode wires 62 and connecting wires 54) that are arranged between the upper and lower transparent substrates 2 and 4 in the image non-display section 20.

With use of image display section spacers 32 having a certain diameter and the image non-display section spacers 34 of the same diameter, according to the present embodiment, therefore, the gap between the upper and lower transparent substrates 2 and 4 can be made uniform in both the image display section 18 and the image non-display section 20. These spacers 32 and 34 of the same diameter can be formed in one and the same process.

If the respective ITO layers of each scanning electrode wire 62, each signal electrode wire 66, and each connecting wire 54 are set to the same thickness (e.g., 0.2 μm), in the liquid crystal display panel of FIG. 2, the image display section spacers 32 and the image non-display section spacers 34 used can be formed having the same diameter by setting the thickness of the color filter layer 24 to be equal to the thickness of the low-reflection chromium layer 22 of each connecting wire 54.

The thickness of the low-reflection chromium layer 22 can be easily adjusted to about 0.4 μm by changing the manufacturing conditions. Further, the thickness of the color filter layer 24 can be reduced to about 0.4 μm by changing the manufacturing conditions and material. Even though the color filter layer 24 is thus thinned, display with chroma equivalent to that of normal color filter layer (0.8 µm thick) can be realized by substantially doubling the color density of the color filter material.

Figure 3:
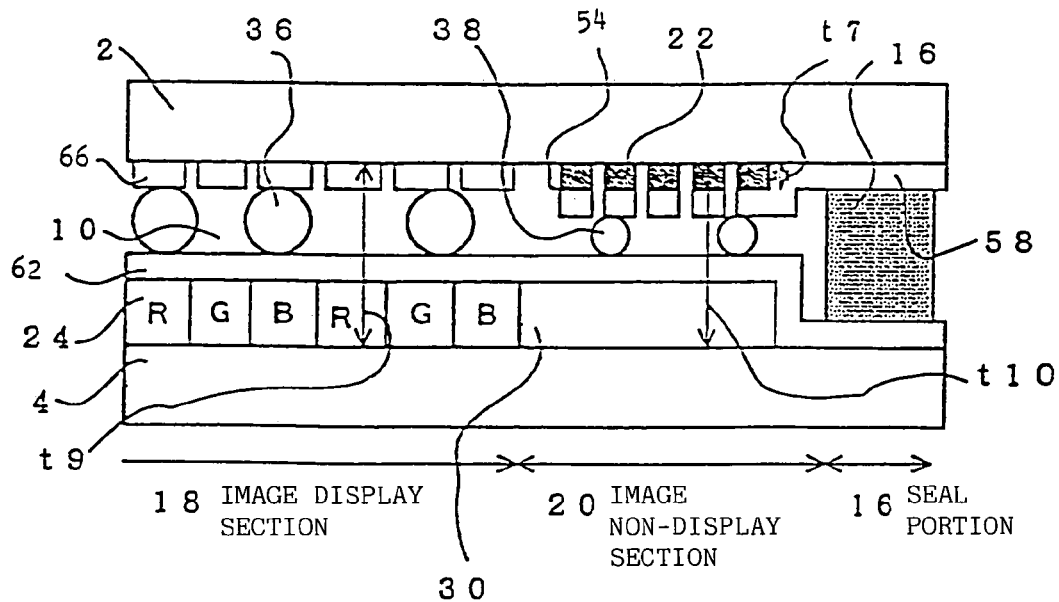
FIG. 3 is a sectional view of a liquid crystal display panel according to a third embodiment of the invention.

A liquid crystal display panel according to a third embodiment will be described with reference to FIG. 3. In FIG. 3, the same reference numerals are used for component parts identical with those shown in FIG. 1.

In the present embodiment, a shielding layer 30 is provided on the image non-display section 20 of the lower transparent substrate 4. The shielding layer 30 on the lower transparent substrate 4 can prevent leakage of light from between the connecting wires 54 that are covered by the low-reflection chromium layer 22 each, thereby improving the image quality. In order to facilitate the manufacture of the shielding layer 30, its thickness is set to 0.8 µm so that the film 30 is as thick as the color filter layer 24. On the other hand, the thickness of the low-reflection chromium layer 22 is kept at about 0.3 µm, as in the case of the liquid crystal display panel of FIG. 1.

In the liquid crystal display panel of FIG. 3, the shielding layer 30 is as thick as the color filter layer 24. Therefore, the gap between the upper and lower transparent substrates 2 and 4 in the image non-display section 20 is made equal to the gap for the case of the liquid crystal display panel of FIG. 1 by reducing the diameter of image non-display section spacers 38.

In consequence, in the liquid crystal display panel of FIG. 3, the thickness of the shielding layer 30 is made equal to that of the color filter layer 24. Thus, with use of the image non-display section spacers 38 having a diameter smaller than that of image display section spacers 36, a gap t9 between the upper and lower transparent substrates 2 and 4 in the image display section 18 is made equal to a gap t10 between the substrates 2 and 4 in the image non-display section 20. Accordingly, the resulting liquid crystal display panel is free from unevenness in display.

Arrangement of the spacers having the different diameters in the image display section 18 and the image non-display section 20 in the liquid crystal layer 10 is realized by conventional methods, such as by masking the display section 18 or 20 to distribute the spacers, forming the spacers having the different diameters separately in the display sections 18 and 20 by printing, or forming the spacers separately in the display sections 18 and 20 by photolithography.

Figure 4:
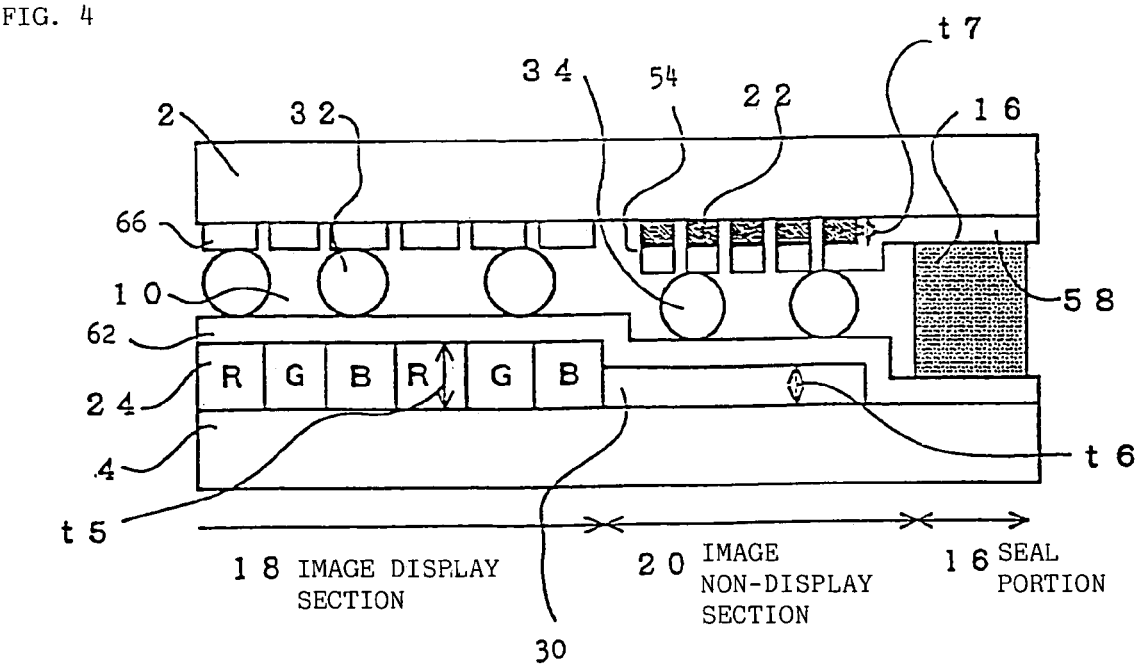
FIG. 4 is a sectional view of a liquid crystal display panel according to a fourth embodiment of the invention.

The configuration in which the spacers that are smaller in diameter than the image display section spacers 36 are used for the image non-display section spacers 38, as shown in FIG. 4, is also applicable to a monochrome liquid crystal display panel that has no color filter layer 24.

A liquid crystal display panel according to a fourth embodiment will be described with reference to FIG. 4. In FIG. 4, the same reference numerals are used for component parts identical with those shown in FIG. 1.

In the liquid crystal display panel of FIG. 4, a shielding layer 30 formed of black resin is provided on the image non-display section 20 of the lower transparent substrate 4. The shielding layer 30 on the lower transparent substrate 4 can prevent leakage of light from between the connecting wires 54 that are covered by the low-reflection chromium layer 22 each, thereby improving the image quality, as in the foregoing third embodiment.

The shielding layer 30 is thinner than each color filter layer 24. In this case, the shielding layer 30 can be easily made thinner than the filter layer 24 by applying resin material with the viscosity lowered to form the shielding layer 30 or by changing the conditions of formation by means of a spinner. In the present embodiment, the thickness of the color filter layer 24 is set to 0.8 µm, while that of the shielding layer 30 is set to 0.5 µm, for example. Further, the thickness of the low-reflection chromium layer 22 of each connecting wire 54 is set to 0.3 µm. Thus, the thickness t5 (0.8 µm) of the color filter layer 24 is substantially equal to the sum of a thickness t6 (0.5 µm) of the shielding layer 30 and a thickness t7 (0.3 µm) of the low-reflection chromium layer 22.

If the respective ITO layers of each signal electrode wire 66 and each connecting wire 54 are set to the same thickness, according to the present embodiment, therefore, the gap between the upper and lower transparent substrates 2 and 4 can be made uniform in both the image display section 18 and the image non-display section 20 with use of image display section spacers 32 having a certain diameter and the image non-display section spacers 34 having the same diameter as that of the image display section spacers 32.

Thus, in the liquid crystal display panel of FIG. 4, the thickness of the shielding layer 30 in the image non-display section 20 is made smaller than the thickness t5 of the color filter layer 24 by a margin corresponding to the thickness t7 of the low-reflection chromium layer 22 of each connecting wire 54. Therefore, the image display section spacers 32 and the image non-display section spacers 34 used can be formed having the same diameter, so that the management of the spacers during manufacture is easy.

In each of the liquid crystal display panels shown in FIGS. 1 to 4, the reflective layer or translucent reflective layer is spread over the whole area of the lower transparent substrate 4, though not shown in FIG. 1.

Figure 5:
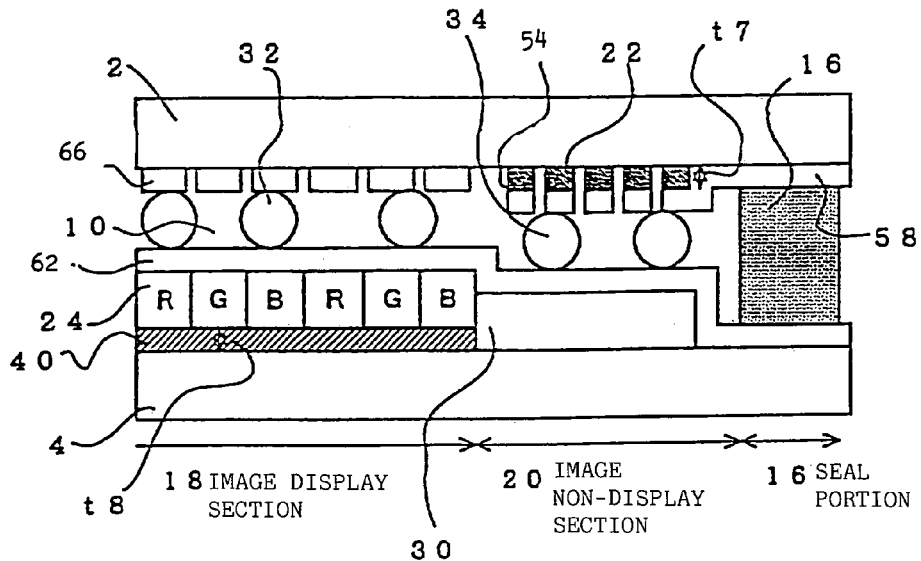
FIG. 5 is a sectional view of a liquid crystal display panel according to a fifth embodiment of the invention.

A liquid crystal display panel according to a fifth embodiment will be described with reference to FIG. 5. In FIG. 5, the same reference numerals are used for component parts identical with those shown in FIG. 1.

In the liquid crystal display panel of FIG. 5, a reflective layer 40 is provided only in the image display section 18 on the lower transparent substrate 4. The reflective layer 40 is formed having a thickness of about 0.3 µm. As in the case of FIG. 4, moreover, the shielding layer 30 is formed having the same thickness of 0.8 µm as the color filter layer 24.

In this embodiment, a thickness t8 of the reflective layer 40 is equal to the thickness t7 of the low-reflection chromium layer 22. If the respective ITO layers of each scanning electrode wire 62 and each signal electrode wire 66 are formed having the same thickness, therefore, the gap between the upper and lower transparent substrates 2 and 4 can be made uniform in both the image display section 18 and the image non-display section 20 with use of the image display section spacers 32 having a certain diameter and the image non-display section spacers 34 having the same diameter as that of the image display section spacers 32. Accordingly, the resulting liquid crystal display panel is free from unevenness in display.

Thus, according to the present embodiment, the shielding layer 30 and the color filter layer 24 are formed having the same thickness, and the thickness of each connecting wire 54 is made substantially equal to the sum of the respective thicknesses of the reflective layer 40 and each scanning electrode wire 62. Accordingly, the resulting liquid crystal display panel is small-sized and free from deterioration of display.

There are various reflective layers, such as one that reflects light substantially totally, a translucent reflective layer that transmits and reflects light at a fixed ratio, and a reflective layer that is partially bored for each pixel so that light can be transmitted at a fixed ratio. However, the concept of the reflective layer of FIG. 5 includes all these reflective layers.

Figure 6:
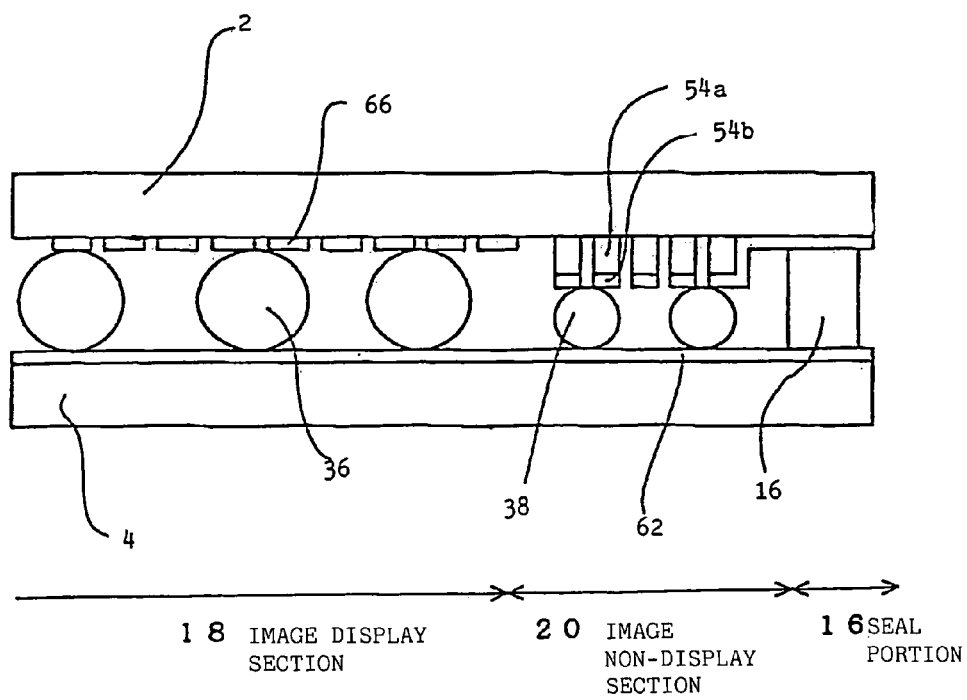
FIG. 6 is a sectional view of a liquid crystal display panel according to a sixth embodiment of the invention.
Figure 7:
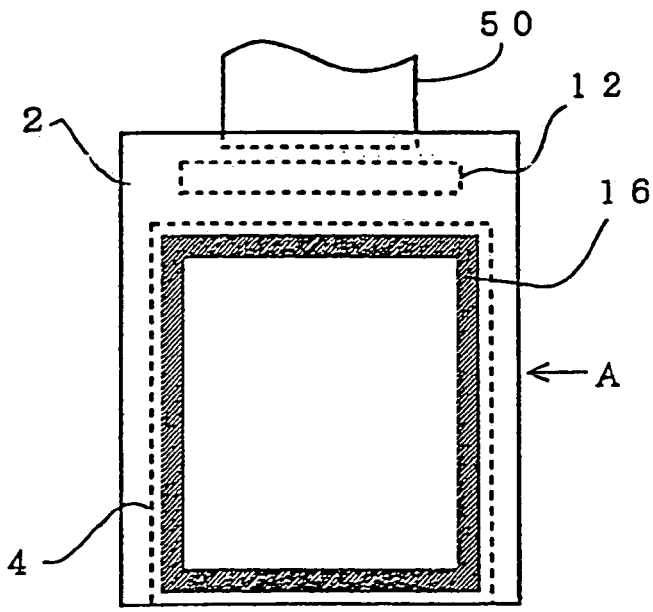
FIG. 7 is a plan view of a conventional liquid crystal display panel.
Figure 8:
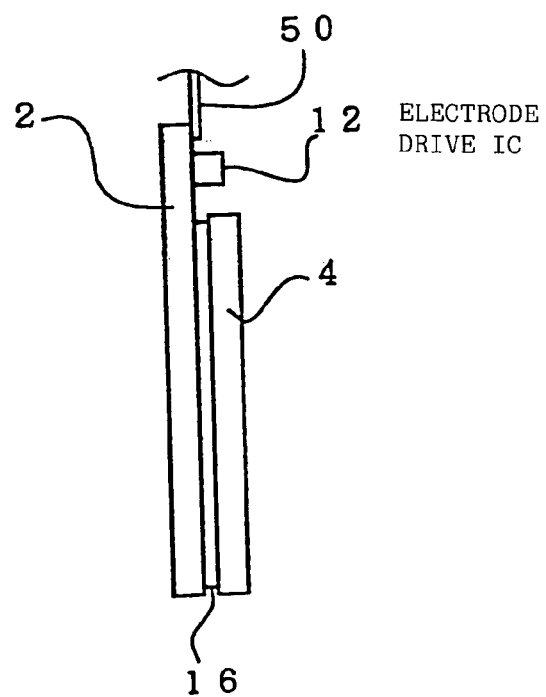
FIG. 8 is a side view of the liquid crystal display panel of FIG. 7.

A liquid crystal display panel according to a sixth embodiment will be described with reference to FIG. 6. In FIG. 6, the same reference numerals are used for component parts identical with those shown in FIG. 1.

The liquid crystal display panel shown in FIG. 6 differs from the liquid crystal display panels shown in FIGS. 1 to 5 in that it is a monochrome liquid crystal display panel having no color filter layer 24 and that each connecting wire 54 is a laminate structure of two ITO layers, not a combination of an ITO layer and a low-reflection chromium layer.

Each connecting wire is a laminate structure that is formed of a first ITO layer 54a on the upper transparent substrate 2 and a second ITO layer 54b on the first ITO layer 54a. After the first ITO layer 54a is formed on the upper transparent substrate 2 in the image non-display section 20 in the same process as the process where the second ITO layer 54b is formed on the first ITO layer 54a, an ITO layer of each signal electrode wire 66 is formed in the image display section 18 on the upper transparent substrate 2 as. The thickness of the second ITO layer 54b is equal to that of the ITO layer of the signal electrode wire 66. The first ITO layer 54a is made thicker than the second ITO layer 54b so that the overall resistance of the connecting wires is lowered.

In the present embodiment, the diameter of each image non-display section spacer 38 is made smaller than the diameter of each image display section spacer 36 by a margin corresponding to the thickness of the first ITO layer 54a. By doing this, the gap between the upper and lower transparent substrates 2 and 4 in the image display section 18 is equalized to the gap between the substrates 2 and 4 in the image non-display section 20. Thus, the resulting liquid crystal display panel is free from unevenness in display.

In the liquid crystal display panel of FIG. 6, each connecting wire 54 is formed having a double-ITO structure so that its thickness is increased to lower the resistance. Also in the liquid crystal display panels shown in FIGS. 1 to 5, each connecting wire 54 may be formed having a double-ITO structure so that the resistance is lowered, instead of having a laminate structure that includes an ITO layer and a low-reflection chromium layer.

As described above, the present invention is characterized in that the distance between the upper and lower transparent substrates is made substantially uniform in both the image display section and the image non-display section by making equal the total thicknesses of the members between the upper and lower transparent substrates, including the spacers, in the two display sections. If any problem on design requires the respective ITO layers of the scanning electrode wires and the signal electrode wires to be varied in thickness, therefore, the method of the present invention can adjust the thickness.

What is claimed is:

1. A liquid crystal display panel, in which a liquid crystal layer is held between a first substrate and a second substrate having electrodes each, and drive electrode groups for individually driving the electrodes of the first substrate and the electrodes of the second substrate are arranged on one side of, or one and the opposite sides of, the first substrate, comprising:

a seal portion bonding the first and second substrates together;

connecting wires set on a side perpendicular to the side on which drive electrode groups are arranged and connecting the electrodes and the drive electrode groups; and an image display section located inside the seal portion and an image non-display section located between the image display section and the seal portion, wherein:

said electrodes are formed of indium-tin oxide, and each said connecting wire is a two-layer structure formed of an indium-tin oxide layer and a low-reflection metal layer, the connecting wires are arranged in the image non-display section and have a thickness greater than that of the electrodes in the image display section, and spacers having predetermined diameters are arranged in said image display section and non-display section, respectively, such that the distance between the first and second substrates in the image non-display section is substantially equal to the distance between the first and second substrates in the image display section.

2. A liquid crystal display panel, in which a liquid crystal layer is held between a first substrate and a second substrate having electrodes each, and drive electrode groups for individually driving the electrodes of the first substrate and the electrodes of the second substrate are arranged on one side of, or one and the opposite sides of, the first substrate, comprising:

a seal portion bonding the first and second substrates together;

connecting wires set on a side perpendicular to the side on which drive electrode groups are arranged and connecting the electrodes and the drive electrode groups; and an image display section located inside the seal portion and an image non-display section located between the image display section and the seal portion, wherein:

said electrodes are formed of indium-tin oxide, and each said connecting wire is a two-layer structure formed of an indium-tin oxide layer, the connecting wires are arranged in the image non-display section and have a thickness greater than that of the electrodes in the image display section, and spacers having predetermined diameters are arranged in said image display section and non-display section, respectively, such that the distance between the first and second substrates in the image non-display section is substantially equal to the distance between the first and second substrates in the image display section.

3. The liquid crystal display panel according to claim 1 or 2, wherein each said connecting wire includes a low-reflection metal layer.

4. The liquid crystal display panel according to claim 1 or 2, wherein a color filter layer is arranged in the image display section, and the diameter of the spacers arranged in the image display section is smaller than that of the spacers arranged in the image non-display section.

5. The liquid crystal display panel according to claim 1 or 2, which further comprises a color filter layer arranged in the image display section, and wherein the thickness of each said connecting wire is substantially equal to the sum of the thickness of said color filter layer and the thickness of each said electrode.

6. The liquid crystal display panel according to claim 1 or 2, which further comprises a shielding layer located in the image non-display section.

7. The liquid crystal display panel according to claim 1 or 2, wherein said drive electrode groups are mounted directly with an electrode drive IC.

8. The liquid crystal display panel according to claim 1, wherein said low-reflection metal layer is a two-layer structure formed of a chromic oxide layer and a chromium layer.

9. The liquid crystal display panel according to claim 2, which further comprises a color filter layer arranged in the image display section and a shielding layer arranged in the image non-display section.

10. The liquid crystal display panel according to claim 1, which further comprises a color filter layer arranged in the image display section and a shielding layer arranged in the image non-display section.

11. The liquid crystal display panel according to claim 10, which further comprises a color filter layer thicker than the shielding layer and arranged in the image display section.

12. The liquid crystal display panel according to claim 10, wherein said color filter layer is substantially as thick as said shielding layer, and the diameter of the spacers arranged in the image display section is greater than that of the spacers arranged in the image non-display section.

13. The liquid crystal display panel according to claim 10, wherein a reflective layer and said color filter layer are arranged to overlap each other in the image display section, and said color filter layer is substantially as thick as the shielding layer, and the thickness of each said connecting wire is substantially equal to the sum of the thickness of the reflective layer and the thickness of each said electrode.

14. The liquid crystal display panel according to claim 10, wherein said color filter layer and a reflective layer are arranged to overlap each other in the image display section and each said connecting wire is a two-layer structure formed of an indium-tin oxide layer and a low-reflection metal layer, the thickness of the indium-tin oxide layer constituting the connecting wire is substantially as thick as the indium-tin oxide constituting the electrode, said color filter layer is substantially as thick as the shielding layer, and said low-reflection metal layer is substantially as thick as said reflective layer.

15. The liquid crystal display panel according to claim 5, wherein said shielding layer is formed of black resin.

16. The liquid crystal display panel according to claim 10, wherein the thickness of the indium-tin oxide layer constituting the connecting wire is substantially as thick as the indium-tin oxide constituting the electrode, and the thickness of said shielding layer is smaller than the thickness of said color filter layer by a margin corresponding to the thickness of the low-reflection metal layer.

17. A liquid crystal display panel, in which a liquid crystal layer is held between a first substrate and a second substrate having electrodes each, and drive electrode groups for individually driving the electrodes of the first substrate and the electrodes of the second substrate are arranged on one side of, or one and the opposite sides of, the first substrate, comprising:

a seal portion bonding the first and second substrates together;

connecting wires set on a side perpendicular to the side on which drive electrode groups are arranged and connecting the electrodes and the drive electrode groups; and an image display section located inside the seal portion and an image non-display section located between the image display section and the seal portion, wherein:

the connecting wires are arranged in the image non-display section and have a thickness greater than that of the electrodes in the image display section, a shielding layer is arranged in the image non-display section, and a reflective layer and a color filter layer are arranged to be overlapped with each other in the image display section, said color filter layer being substantially as thick as the shielding layer, and the thickness of each said connecting wire being substantially equal to the sum of the thickness of the reflective layer and the thickness of each said electrode, and the distance between the first and second substrates in the image non-display section being substantially equal to the distance between the first and second substrates in the image display section.

* * * * *